United States Patent [19]

Xu et al.

[11] Patent Number: 5,734,494
[45] Date of Patent: Mar. 31, 1998

[54] WAVELENGTH CONVERSION DEVICE AND WAVELENGTH CONVERSION METHOD

[75] Inventors: Chang Qing Xu; Hideaki Okayama, both of Tokyo, Japan

[73] Assignee: Oki Electric Industry Co., Ltd., Tokyo, Japan

[21] Appl. No.: 683,433

[22] Filed: Jul. 18, 1996

[30] Foreign Application Priority Data

Jul. 25, 1995 [JP] Japan ................... 7-189396

[51] Int. Cl.$^6$ ........................... G02F 1/39
[52] U.S. Cl. ........................... 359/332; 385/122
[58] Field of Search ................ 385/122; 359/326, 359/328, 329, 330, 332

[56] References Cited

U.S. PATENT DOCUMENTS

| | | | |
|---|---|---|---|
| 5,274,727 | 12/1993 | Ito et al. | 385/122 |
| 5,434,700 | 7/1995 | Yoo | 359/332 |
| 5,504,616 | 4/1996 | Shinozaki et al. | 359/326 |

OTHER PUBLICATIONS

"Wavelength conversion by quasi-phase-matched difference frequency generation in AlGaAs waveguides", S.J.B. Yoo, et al, OFC 95, pp. PD14-1 thru PD14-5 (1995) [no month].

*Primary Examiner*—John D. Lee
*Attorney, Agent, or Firm*—Spencer & Frank

[57] ABSTRACT

A wavelength conversion device includes a wavelength conversion element. The wavelength conversion element includes a ridge waveguide layer made of nonlinear optical crystals as being a zinc-blend material. The waveguide layer is provided on a GaAs substrate made of the zinc-blend material. The waveguide layer is made of InGaAsP and interposed between clad layers made of InGaP. With this arrangement, signal light and pumping light are incident upon the wavelength conversion element (DFG or SFG element) while the pumping light is fixed in a TE polarization direction. Alternatively, the signal light may be fixed in the TE polarization direction.

2 Claims, 2 Drawing Sheets

WAVELENGTH CONVERSION DEVICE AND WAVELENGTH CONVERSION METHOD

BACKGROUND OF THE INVENTION

1. Field of the Invention

The present invention relates to a wavelength conversion device and a wavelength conversion method using sum frequency generation (SFG) or difference frequency generation (DFG) under a quasi-phase matching (QPM) condition.

2. Description of the Prior Art

One example of the conventional wavelength conversion devices is disclosed in a literature "S. J. B. Yoo, et al., OFC' 95, PD14.". In this literature, the wavelength conversion device employs a wavelength conversion element having a waveguide in which a period of domain inversion grating is set in a waveguide direction so as to satisfy the QPM condition. By inputting pumping light of an angular frequency $\omega_p$ and signal light of an angular frequency $\omega_s$ into the wavelength conversion element, the wavelength conversion is achieved so as to obtain converted light of an angular frequency $\omega_c$.

However, in the conventional wavelength conversion device, it is necessary to fix polarization planes of both pumping light and signal light in the polarization directions when inputting them into the wavelength conversion element.

Accordingly, polarizer elements are required for both of pumping light and signal light to obtain linearly polarized light of them, respectively, so that the wavelength conversion device is caused to be complicated in structure. Further, for obtaining the linearly polarized light, it is possible that light losses are generated with respect to both pumping light and signal light.

As appreciated, the polarization plane of the signal light is not fixed, but rotates. Thus, it is necessary to adjust a polarizing surface of the polarizer element for the signal light.

SUMMARY OF THE INVENTION

Therefore, it is an object of the present invention to provide an improved wavelength conversion device.

It is another object of the present invention to provide an improved wavelength conversion method.

According to one aspect of the present invention, a wavelength conversion device comprises a wavelength conversion element including a waveguide layer provided on a semiconductor substrate and made of nonlinear optical crystals as being a zinc-blend material, the waveguide layer capable of propagating incident light in one of <110> and <–110> directions and having means for satisfying a quasi-phase matching condition, the means including first and second domains having different refraction indexes or different quadratic nonlinear constants so as to satisfy a given equation, the first and second domains arranged alternately and periodically in the propagation direction of the incident light in the waveguide layer, the wavelength conversion element producing converted light in the form of one of a difference frequency wave and a sum frequency wave when signal light and pumping light are incident upon the waveguide layer as the incident light; and polarization direction fixing means for fixing a polarization direction, as being a vibration direction of an electric vector of one of the signal light and the pumping light, in a TE polarization direction, the TE polarization direction being orthogonal to the propagation direction of the incident light and along a plane along which the waveguide layer extends, the equation given by $$\Delta k_1 \, l_1 = \Delta k_2 \, l_2 = (2m+1)\pi \quad (1)$$

wherein $\Delta k_1$ and $\Delta k_2$ represent phase mismatching magnitudes of the first and second domains, respectively, l and $l_2$ represent lengths of the first and second domains in the propagation direction of the incident light, respectively, and m represents an integer.

According to another aspect of the present invention, in a wavelength conversion device including a wavelength conversion element having a waveguide layer provided on a semiconductor substrate and made of nonlinear optical crystals as being a zinc-blend material, the waveguide layer capable of propagating incident light in one of <110> and <–110> directions and having means for satisfying a quasi-phase matching condition, the means including first and second domains having different refraction indexes or different quadratic nonlinear constants so as to satisfy a given equation, the first and second domains arranged alternately and periodically in the propagation direction of the incident light in the waveguide layer, the wavelength conversion element producing converted light in the form of one of a difference frequency wave and a sum frequency wave when signal light and pumping light are incident upon the waveguide layer as the incident light, the equation given by $$\Delta k_1 \, l_1 = \Delta k_2 \, l_2 = (2m+1)\pi \quad (1)$$

wherein $\Delta k_1$ and $\Delta k_2$ represent phase mismatching magnitudes of the first and second domains, respectively, $l_1$ and $l_2$ represent lengths of the first and second domains in the propagation direction of the incident light, respectively, and m represents an integer, a wavelength conversion method comprises the steps of inputting one of the signal light and the pumping light into the waveguide layer along with the other of the signal light and the pumping light, while fixing a polarization direction, as being a vibration direction of an electric vector of the one of the signal light and the pumping light, in a TE polarization direction, the TE polarization direction being orthogonal to the propagation direction of the incident light and along a plane along which the waveguide layer extends, so as to obtain the converted light in the form of the one of the difference frequency wave and the sum frequency wave.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Figure 1:
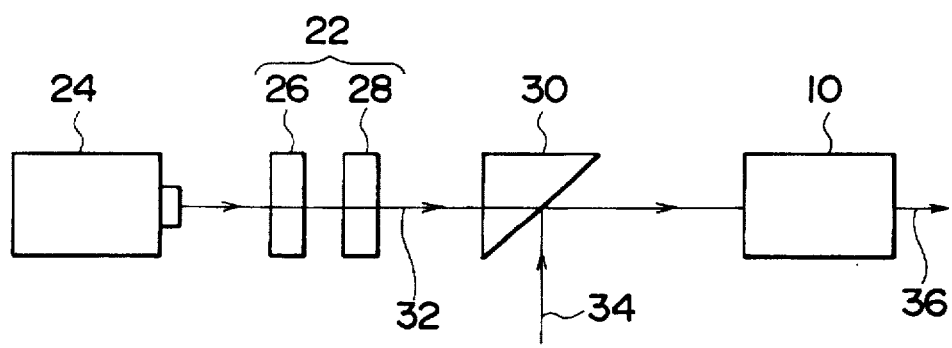
FIG. 1 is a structural diagram for explaining a wavelength conversion device according to a first preferred embodiment of the present invention.

Prior to description of preferred embodiments, the basic concepts of the present invention will be described hereinbelow.

According to the present invention, a wavelength conversion element of a wavelength conversion device includes a waveguide layer made of a zinc-blend material which is laminated on a semiconductor substrate. The zinc-blend material has a particular nonlinear constant matrix as represented by an equation (2) noted below.

In the waveguide layer of the zinc-blend material, a nonlinear polarization Pi (i=x, y, z) caused by pumping light and signal light is expressed by the following equation (2):

$$\begin{pmatrix} P_x \\ P_y \\ P_z \end{pmatrix} = \begin{pmatrix} 000d00 \\ 0000d0 \\ 00000d \end{pmatrix} \begin{pmatrix} Exp\ Exs \\ Eyp\ Eys \\ Ezp\ Ezs \\ Ezp\ Exs + Exp\ Ezs \\ Eyp\ Ezs + Ezp\ Eys \\ Exp\ Eys + Eyp\ Exs \end{pmatrix} \quad (2)$$

wherein $E_{XP}$, $E_{YP}$ and $E_{ZP}$ represent electric field components of the pumping light in X, Y and Z directions, respectively, $E_{XS}$, $E_{YS}$ and $E_{ZS}$ represent electric field components of the signal light in X, Y and Z directions, respectively, d represents a quadratic nonlinear constant, and Eip and Eis (i=x, y, z) represent electric field components of the pumping light and the signal light, respectively.

An electric field component $E_P$ of the pumping light is given by the following equation (3):

$$E_P = (E_{XP}^2 + E_{YP}^2 + E_{ZP}^2)^{1/2} \quad (3)$$

An electric field component $E_S$ of the signal light is given by the following equation (4):

$$E_S = (E_{XS}^2 + E_{YS}^2 + E_{ZS}^2)^{1/2} \quad (4)$$

If, for example, a polarization plane of the pumping light is fixed in a TE polarization direction (for example, <110> direction), the X, Y and Z components of the electric field component of the pumping light are expressed by the following equations (5) and (6), respectively:

$$E_{XP} = E_{YP} = E_p/2^{1/2} \quad (5)$$

$$E_{ZP} = 0 \quad (6)$$

Further, if, for example, a polarization plane of the signal light is fixed in the TE polarization <110> direction, the X, Y and Z components of the electric field component of the signal light are expressed by the following equations (7) and (8), respectively:

$$E_{XS} = E_{YS} = E_s/2^{1/2} \quad (7)$$

$$E_{ZS} = 0 \quad (8)$$

By substituting the equations (5) to (8) into the equation (2), X, Y and Z components of the nonlinear polarization Pi are given by the following equations (9) and (10), respectively:

$$P_x = P_y = 0 \quad (9)$$

$$P_z = dE_s E_p \quad (10)$$

From the equations (9) and (10), it is known that the caused nonlinear polarization is a TM wave orthogonal to a TE wave of the signal light. Further, a magnitude of the nonlinear polarization is given by the following equation (11):

$$P = dE_s E_p \quad (11)$$

On the other hand, if, for example, the polarization plane of the signal light is fixed in a TM polarization direction, the X, Y and Z components of the electric field component of the signal light are expressed by the following equations (12) and (13), respectively:

$$E_{XS} = E_{YS} = 0 \quad (12)$$

$$E_{ZS} = E_s \quad (13)$$

By substituting the equations (5), (6), (12) and (13) into the equation (2), the X, Y and Z components of the nonlinear polarization Pi are given by the following equations (14) and (15), respectively:

$$P_x = P_y = dE_s E_p/2^{1/2} \quad (14)$$

$$P_z = 0 \quad (15)$$

From the equations (14) and (15), it is known that the caused nonlinear polarization is the TE wave orthogonal to the TM wave of the signal light. Further, a magnitude of the nonlinear polarization is given by the following equation (16):

$$P = dE_s E_p \quad (16)$$

From the equations (11) and (16), if the polarization plane of the pumping light is fixed in the TE polarization direction (for example, <110> direction), the caused nonlinear polarization is always orthogonal to the polarization plane of the signal light and its magnitude is constant, that is, $P = dE_S E_P$. Further, the light intensity of the converted light is proportional to the magnitude of the nonlinear polarization. Thus, the wavelength conversion efficiency is independent of the polarization direction of the signal light and thus constant.

Further, if the signal light is fixed in the TE polarization direction, the caused nonlinear polarization is also always orthogonal to the polarization plane of the pump light and its magnitude is constant, i.e. $P = dE_S E_P$. Thus, the wavelength conversion efficiency is independent of the polarization direction of the pumping light and thus constant.

As appreciated from the foregoing, according to the present invention, the wavelength conversion can be achieved without relying on, that is, independent of, the polarization direction of the pumping light or the signal light. As a result, the element for linearly polarizing the pumping light or the signal light is not required so that the structure of the wavelength conversion device can be simplified.

Further, if, particularly, the pumping light is fixed, the wavelength conversion can be achieved independent of the polarization plane of the signal light so that the light loss of the signal light can be suppressed. Moreover, even if the polarization plane of the signal light rotates, the wavelength conversion can be reliably achieved with the constant wavelength conversion efficiency.

Now, preferred embodiments of the present invention will be described hereinbelow with reference to the accompanying drawings.

[First Embodiment]

In the first preferred embodiment, the wavelength conversion is performed by only fixing the polarization plane of the pumping light to the TE wave so as to produce a difference frequency (DF) wave.

Figure 2A:
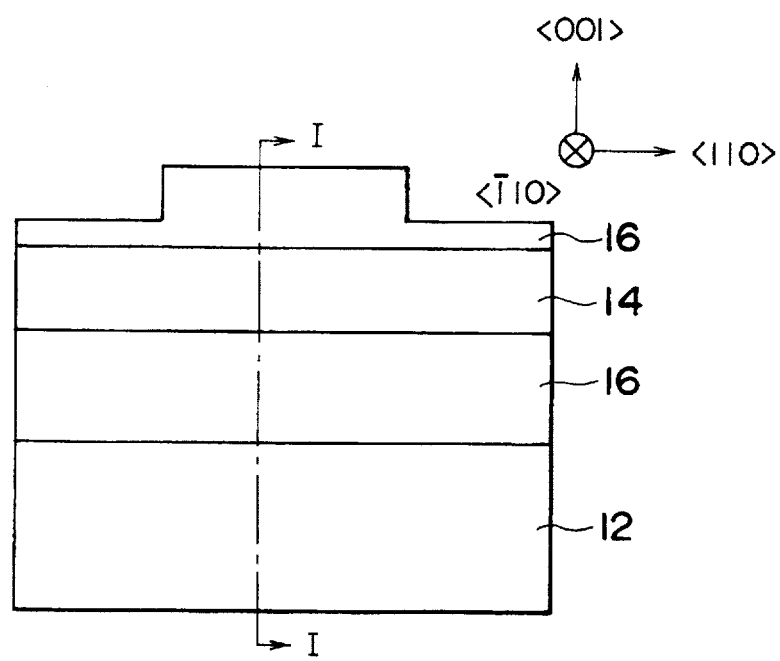
FIG. 2A is a diagram for explaining a wavelength conversion element employed in the wavelength conversion device shown in FIG. 1.
Figure 2B:
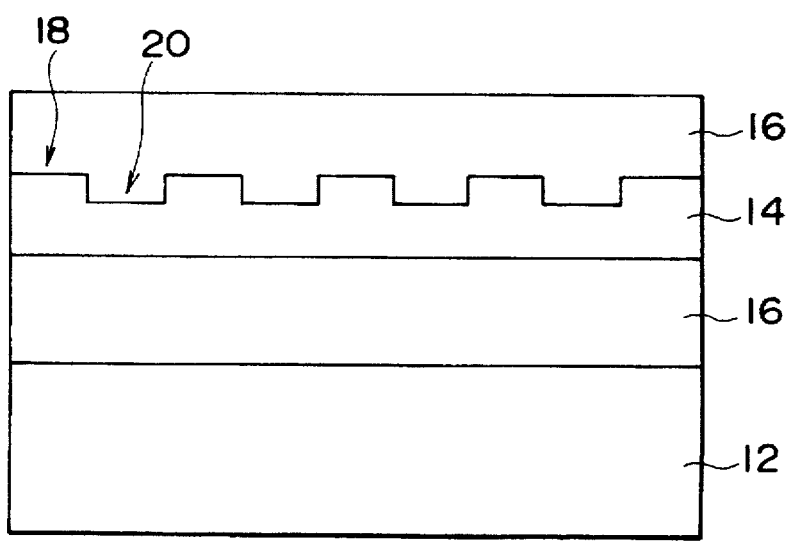
FIG. 2B is a sectional view taken along line I—I in FIG. 2A.

FIG. 1 is a structural diagram for explaining a wavelength conversion device of the first preferred embodiment. FIGS. 2A and 2B are diagrams for explaining a wavelength conversion element employed in the wavelength conversion device shown in FIG. 1, wherein FIG. 2A is a structural diagram seen from the incident end side of the incident light and FIG. 2B is a sectional view taken along line I—I in FIG. 2A, that is, along the incident light propagation direction.

A wavelength conversion element (DFG element) 10 used in the wavelength conversion device includes a GaAs semiconductor substrate 12 made of the zinc-blend material. On a (001) surface of the substrate 12 is provided a ridge waveguide layer 14 made of the nonlinear optical crystal as being the zinc-blend material. The waveguide layer 14 is made of InGaAsP and interposed between clad layers 16 made of InGaP.

Further, the waveguide layer 14 has a grating such that, for satisfying a quasi-phase matching (QPM) condition, first and second domains 18 and 20 having different refraction indexes from each other are alternately and periodically arranged in the propagation direction of the incident light in the waveguide layer 14 so as to satisfy an equation (17) noted below. Accordingly, the waveguide layer 14 extends along a plane including <−110> and <110> directions, and the incident light propagates in the waveguide layer 14 in the <−110> direction. Thus, the waveguide layer 14 forms a waveguide path extending in the <−110> direction. For convenience, <−1> represents "1 with bar" as shown in FIG. 2A.

$$\Delta k_1 \, l_1 = \Delta k_2 \, l_2 = (2m+1)\pi \tag{17}$$

wherein $\Delta k_1$ and $\Delta k_2$ represent phase mismatching magnitudes of the first and second domains, respectively, $l_1$ and $l_2$ represent lengths of the first and second domains in the incident light propagation direction, respectively, and m represents an integer.

In this embodiment, a polarization direction fixing means 22 is provided for fixing the polarization direction of pumping light 32, as being a vibration direction of the electric vector of the pumping light 32, in the TE polarization <110> direction which is orthogonal to the incident light propagation direction and along the plane along which the waveguide layer 14 extends. In the polarization direction fixing means 22, for example, light emitted from a semiconductor laser 24, which is almost linearly polarized light, is first incident upon a ¼ wavelength plate 26 so as to obtain linearly polarized light, and this linearly polarized light is then incident upon a ½ wavelength plate 28 so as to obtain linearly polarized light having a desired polarization plane. In this embodiment, the pumping light is incident upon the wavelength conversion element 10 while fixed in the TE polarization direction by the polarization direction fixing means 22. On the other hand, signal light 34 is incident upon the wavelength conversion element 10 along with the pumping light 32 via, for example, a half mirror 30. With this arrangement, the wavelength conversion is reliably achieved independent Of the polarization direction of the signal light 34 so as to obtain a difference frequency wave 36.

The phase mismatching magnitude $\Delta k_1$ of the first domain 18 is given by the following equation (18):

$$\Delta k_1 = k_{1P} - k_{1S} - k_{1C} \tag{18}$$

wherein $k_{1P}$ represents a wave number vector of the pumping light in the first domain, $k_{1S}$ represents a wave number vector of the signal light in the first domain, and $k_{1C}$ represents a wave number vector of the converted light (DF wave) in the first domain.

The phase mismatching magnitude $\Delta k_2$ of the second domain 20 is given by the following equation (19):

$$\Delta k_2 = k_{2P} - k_{2S} - k_{2C} \tag{19}$$

wherein $k_{2P}$ represents a wave number vector of the pumping light in the second domain, $k_{2S}$ represents a wave number vector of the signal light in the second domain, and $k_{2C}$ represents a wave number vector of the converted light (DF wave) in the second domain.

Further, each of the wave number vectors $k_{1i}$ in the first domain is given by the following equation (20):

$$k_{1i} = (2\pi/\lambda_i) n_{1i} \quad (i=P, S, C) \tag{20}$$

wherein $\lambda_P$, $\lambda_S$ and $\lambda_C$ represent wavelengths of the pumping light incident upon the wavelength conversion element, the signal light incident upon the wavelength conversion element and the converted light outgoing from the wavelength conversion element, respectively, and $n_{1P}$, $n_{1S}$ and $n_{1C}$ represent refraction indexes of the first domain 18 relative to the pumping light, the signal light and the converted light, respectively.

On the other hand, each of the wave number vectors $k_{2i}$ in the second domain is given by the following equation (21):

$$k_{2i} = (2\pi/\lambda_i) n_{2i} \quad (i=P, S, C) \tag{21}$$

wherein $n_{2P}$, $n_{2S}$ and $n_{2C}$ represent refraction indexes of the second domain 20 relative to the pumping light, the signal light and the converted light, respectively.

The wavelengths $\lambda_P$, $\lambda_S$ and $\lambda_C$ have the relationship as represented by the following equation (22):

$$(1/\lambda_C) = (1/\lambda_P) - (1/\lambda_S) \tag{22}$$

In this example, $\lambda_P = 0.78$ µm and $\lambda_S = 1.55$ µm. Thus, $\lambda_C$ representing the wavelength of the DF wave becomes 1.57 µm.

[Second Embodiment]

In the second preferred embodiment, the pumping light is incident upon an SFG (sum frequency generation) element (wavelength conversion element) 10 while fixed in the TE polarization direction so as to produce a sum frequency (SF) wave.

In this embodiment, the structures of the wavelength conversion element and the polarization direction fixing means are the same as those in the first preferred embodiment, but phase mismatching magnitudes differ from those in the first preferred embodiment.

In this embodiment, a phase mismatching magnitude $\Delta k_1$ of the first domain 18 is given by the following equation (23):

$$\Delta k_1 = k_{1P} - k_{1S} + k_{1C} \tag{23}$$

wherein $k_{1P}$ represents a wave number vector of the pumping light in the first domain, $k_{1S}$ represents a wave number vector of the signal light in the first domain, and $k_{1C}$ represents a wave number vector of the converted light (SF wave) in the first domain.

A phase mismatching magnitude $\Delta k_2$ of the second domain 20 is given by the following equation (24):

$$\Delta k_2 = -k_{2P} - k_{2S} + k_{2C} \tag{24}$$

wherein $k_{2P}$ represents a wave number vector of the pumping light in the second domain, $k_{2S}$ represents a wave number vector of the signal light in the second domain, and $k_{2C}$ represents a wave number vector of the converted light (SF wave) in the second domain.

The wavelengths $\lambda_P$, $\lambda_S$ and $\lambda_C$ have the relationship as represented by the following equation (25):

$$(1/\lambda_C) = (1/\lambda_P) + (1/\lambda_S) \tag{25}$$

In this example, $\lambda_P = 1.55$ μm and $\lambda_S = 1.57$ μm. Thus, $\lambda_C$ representing the wavelength of the SF wave becomes 0.78 μm.

Also in the second preferred embodiment, the pumping light is incident upon the wavelength conversion element (SFG element) while fixed in the TE polarization direction by the polarization direction fixing means. With this arrangement, the wavelength conversion is reliably achieved independent of the polarization direction of the signal light.

While the present invention has been described in terms of the preferred embodiments, the invention is not to be limited thereto, but can be embodied in various ways without departing from the principle of the invention as defined in the appended claims.

For example, in the foregoing preferred embodiments, the polarization direction of the pumping light is fixed. On the other hand, it may be arranged that, by fixing the polarization direction of the signal light, the wavelength conversion is achieved independent of the polarization direction of the pumping light so as to produce the DF or SF wave.

Further, in the foregoing preferred embodiment, the waveguide path of the wavelength conversion element extends in the <−110> direction. On the other hand, it may be arranged that the waveguide path extends in the <110> direction, and the pumping light or the signal light is incident upon the wavelength conversion element by fixing its polarization direction in the <−110> direction.

Further, in the foregoing preferred embodiment, the refraction index of the waveguide path of the wavelength conversion element is periodically changed so as to satisfy the QPM condition. On the other hand, it may be arranged that the QPM condition is satisfied by periodically changing the quadratic nonlinear constant of the waveguide path.

What is claimed is:

1. A wavelength conversion device comprising:

a wavelength conversion element including a waveguide layer provided on a semiconductor substrate and made of nonlinear optical crystals as being a zinc-blend material, said waveguide layer capable of propagating incident light in one of <110> and <−110> directions and having means for satisfying a quasi-phase matching condition, said means including first and second domains having different refraction indexes or different quadratic nonlinear constants so as to satisfy a given equation, said first and second domains arranged alternately and periodically in the propagation direction of the incident light in said waveguide layer, said wavelength conversion element producing converted light in the form of one of a difference frequency wave and a sum frequency wave when signal light and pumping light are incident upon said waveguide layer as said incident light; and polarization direction fixing means for fixing a polarization direction, as being a vibration direction of an electric vector of one of said signal light and said pumping light, in a TE polarization direction, said TE polarization direction being orthogonal to said propagation direction of the incident light and along a plane along which said waveguide layer extends, said equation given by $$\Delta k_1 \, l_1 = \Delta k_2 \, l_2 = (2m+1)\pi$$

wherein $\Delta k_1$ and $\Delta k_2$ represent phase mismatching magnitudes of said first and second domains, respectively, $l_1$ and $l_2$ represent lengths of the first and second domains in said propagation direction of the incident light, respectively, and m represents an integer.

2. In a wavelength conversion device including:

a wavelength conversion element having a waveguide layer provided on a semiconductor substrate and made of nonlinear optical crystals as being a zinc-blend material, said waveguide layer capable of propagating incident light in one of <110> and <−110> directions and having means for satisfying a quasi-phase matching condition, said means including first and second domains having different refraction indexes or different quadratic nonlinear constants so as to satisfy a given equation, said first and second domains arranged alternately and periodically in the propagation direction of the incident light in said waveguide layer, said wavelength conversion element producing converted light in the form of one of a difference frequency wave and a sum frequency wave when signal light and pumping light are incident upon said waveguide layer as said incident light, said equation given by $$\Delta k_1 \, l_1 = \Delta k_2 \, l_2 = (2m+1)\pi$$

wherein $\Delta k_1$ and $\Delta k_2$ represent phase mismatching magnitudes of said first and second domains, respectively, $l_1$ and $l_2$ represent lengths of the first and second domains in said propagation direction of the incident light, respectively, and m represents an integer, a wavelength conversion method comprising the steps of:
inputting one of said signal light and said pumping light into said waveguide layer along with the other of said signal light and said pumping light, while fixing a polarization direction, as being a vibration direction of an electric vector of said one of said signal light and said pumping light, in a TE polarization direction, said TE polarization direction being orthogonal to said propagation direction of the incident light and along a plane along which said waveguide layer extends, so as to obtain said converted light in the form of said one of the difference frequency wave and the sum frequency wave.

* * * * *